United States Patent
Berglund

(10) Patent No.: US 8,903,566 B2
(45) Date of Patent: Dec. 2, 2014

(54) PARITY ON DATA LINK SWITCHES

(71) Applicant: Caterpillar Inc., Peoria, IL (US)

(72) Inventor: Darrel Berglund, East Peoria, IL (US)

(73) Assignee: Caterpillar Inc., Peoria, IL (US)

(*) Notice: Subject to any disclaimer, the term of this patent is extended or adjusted under 35 U.S.C. 154(b) by 38 days.

(21) Appl. No.: 13/741,836

(22) Filed: Jan. 15, 2013

(65) Prior Publication Data

US 2014/0200735 A1      Jul. 17, 2014

(51) Int. Cl.
*H01R 27/00* (2006.01)
*H01R 43/00* (2006.01)
*G06F 19/00* (2011.01)
*B60R 16/03* (2006.01)

(52) U.S. Cl.
CPC .............. *G06F 19/00* (2013.01); *B60R 16/0315* (2013.01); *H01R 27/00* (2013.01); *H01R 43/00* (2013.01)
USPC ............................................................ 701/1

(58) Field of Classification Search
None
See application file for complete search history.

(56) References Cited

U.S. PATENT DOCUMENTS

| | | | |
|---|---|---|---|
| 3,594,500 A | | 7/1971 | James et al. |
| 4,179,179 A | * | 12/1979 | Lowden ........................ 439/278 |
| 4,830,621 A | * | 5/1989 | Maue et al. ..................... 439/52 |
| 5,956,247 A | | 9/1999 | Settles et al. |
| 6,031,709 A | | 2/2000 | Ziemkowski |
| 6,920,407 B2 | | 7/2005 | Adamian et al. |
| 2007/0193868 A1 | | 8/2007 | Rouleau |

* cited by examiner

*Primary Examiner* — Tuan C. To
*Assistant Examiner* — Donald J Wallace
(74) *Attorney, Agent, or Firm* — Miller, Matthias & Hull

(57) ABSTRACT

A system for monitoring switch activity using a data network includes a double pole double throw switch biased and connected to provide redundant signals from both outputs of the same switch and to convey both signals over a data network, such as a controller area network (CAN). The switch outputs may be biased to opposite polarities to improve distance between the signals.

20 Claims, 9 Drawing Sheets

PARITY ON DATA LINK SWITCHES

TECHNICAL FIELD

The present disclosure relates to multiplexed data communication and more particularly to parity on switch data transmitted via a data link in a vehicle.

BACKGROUND

As electric and electronic features in vehicles become more common, the physical size and complexity of wiring harnesses connecting components increases. At the same time, the need for reliability at all levels of the system increases as more system critical functions are converted to electronic control. However, improving reliability often involves duplicating services, at the cost of increasing the size and complexity of vehicle wiring harnesses. This creates a particularly difficult problem in retrofit or re-manufacturing situations.

U.S. Pat. No. 3,594,500 uses double pole double throw switches to switch separate signals to one of two logic circuits to use in matching an incoming code sequence with a local address of a missile in a radar to missile link.

In order to reduce the size and complexity of vehicle wiring harnesses, particular in large construction, earthmoving, mining, paving, agricultural, etc. equipment, a data link bus such as a Controller Area Network bus (CAN bus) or other suitable data bus may be used to multiplex connections from multiple sources over a single wire, 2-wire or 4-wire network to a controller. The exemplary CAN bus was developed in the mid-1980's for in-vehicle and other data network applications.

SUMMARY OF THE DISCLOSURE

In one aspect of the current disclosure, a method of providing switch status confirmation on a vehicle data bus using a double pole switch configures a socket module having multiple sockets to accept the double pole switch at two socket locations that each support a single pole switch, each socket having terminals. The double pole switch may be coupled to the socket module over more than one socket. At least a portion of the terminals of the double pole switch may be biased to provide a first signal on a first common output of the double pole switch and a second signal on a second common output of the double pole switch. The first signal and the second signal may be provided to a controller via a data network.

In another aspect of the current disclosure, a system that provides parity for switch operation in a vehicle may include a controller responsive to input signals, a data network coupled to the controller, and a socket module having a plurality of sockets with connection points arranged in a pattern configured to accept a plurality of single pole switches, each of the plurality of sockets having a respective output connection. The system may also include a double pole double throw switch having connection points configured for mating with the socket module, wherein the double pole double throw switch is coupled to the socket module over two of the plurality of sockets. The system may further include a data network interface coupled to each respective output connection of each of the plurality of sockets of the socket module that provides switch information via the data network to the controller.

In yet another aspect of the disclosure, a socket module supporting parity information for switch closures includes a plurality of switch sockets with terminal points arranged in a repeating pattern arranged to accept a single pole switch at each of the plurality of switch sockets and to accept a double pole switch via any two adjacent switch sockets of the plurality of switch sockets and a data network controller configured to receive information from at least one terminal of each of the plurality of switch sockets and further configured to transmit the information to a controller over a multiplexed data network.

DETAILED DESCRIPTION

Especially in large equipment, failure of a simple input switch can have very negative effects. For example, failure of a switch controlling a parking brake or implement lockout can cause serious damage or bodily injury. Simple single pole, single throw (SPST) switches can experience failures in several ways. The switch lever might operate and the contacts may not change position. The mechanical linkage may be broken. Contamination may prevent the contacts from touching. The contacts might be welded shut. The contacts may become oxidized and fail to make electrical contact.

However, by using a double pole, double throw (DPDT) switch, particularly in configurations describe in more detail below, a majority of failures of the switch can be detected. Further, when using a standard switch rack, an application previously configured with one SPST switch can be converted to a DPDT configuration simply by using a second switch slot in the rack and allocating a second logical connection to the parity input.

Figure 1:
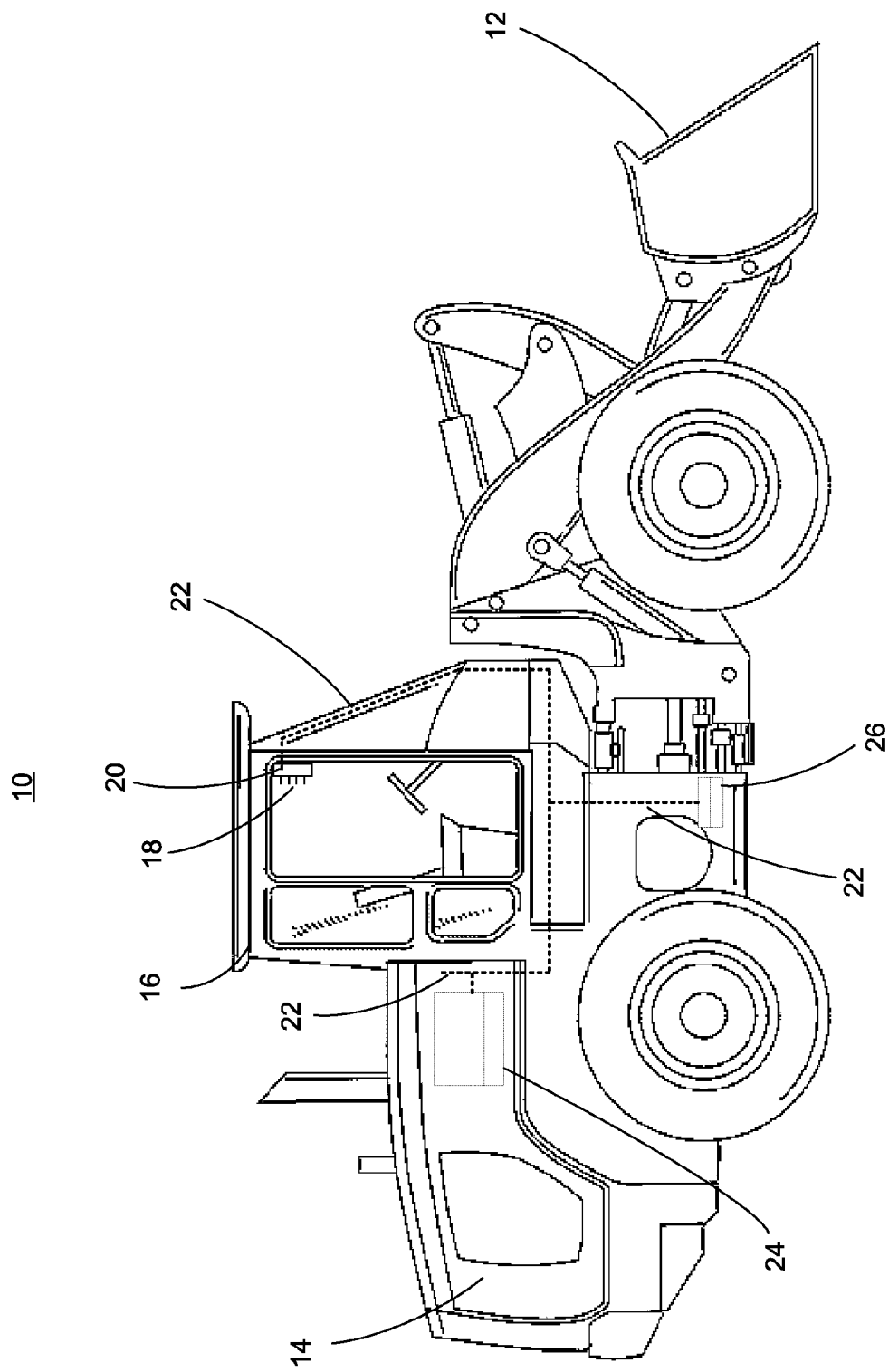
FIG. 1 is a plan view of a vehicle illustrating an exemplary environment for parity on data link switches.

FIG. 1 is a plan view of a vehicle 10 illustrating an exemplary environment for parity on data link switches. The vehicle 10 is illustrated as a wheel loader but could be any of a number of vehicles including but not limited to those intended for construction, railroad, agricultural, paving, mining, logging, railroad, or other uses.

The vehicle 10 may include an implement 12, an engine 14, and a cab 16. The cab may include operator controls such as switches 18 connected to a socket assembly 20 and a data network interface (not separately depicted in FIG. 1). Information from the switches 18 may be conveyed via a data network 22 to other parts of the vehicle 10. An engine controller 24 may control both engine functions and various feature capabilities such as parking brake locking, implement lockout, operating in convenience lights, etc. an exemplary feature controller 26 is illustrated coupled to data network 22.

The switches 18 may be used by an operator to request of the engine controller 24, or another associated controller, for a particular function or featured to be activated or deactivated. In some cases, failure of the switch to operate may be easily detected, for example, if a cab light switch is turned on and the cab light does not turn on it is fairly easy to determine that a failure has occurred, either in the switch, the light bulb, or an intermediate circuit. However, other operations such as setting a parking brake or locking an implement 12 may not have immediate feedback like a light bulb.

Figure 2:
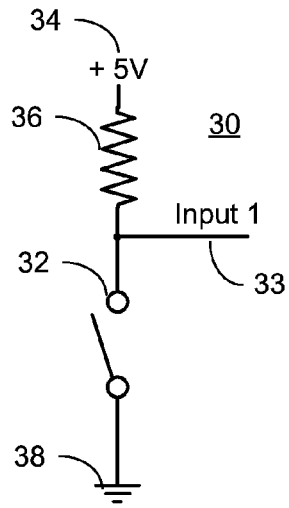
FIGS. 2 and 3 illustrate prior art single pole switch configurations.
Figure 3:
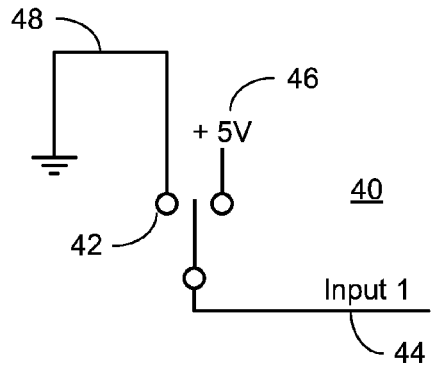
Figure 4:
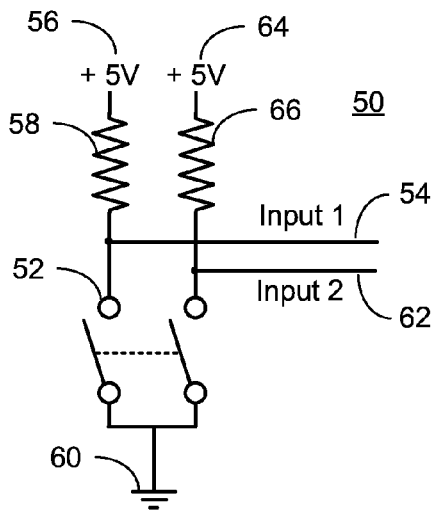
FIG. 4 illustrates a double pole double throw switch configuration.
Figure 5:
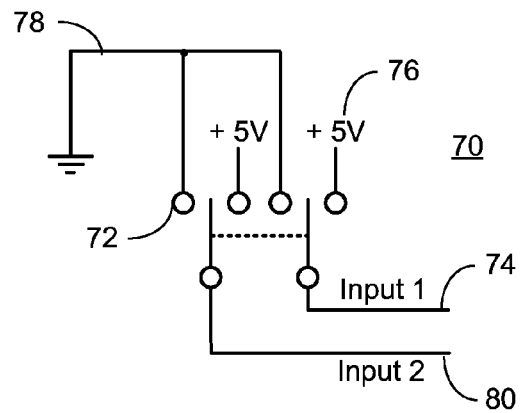
FIG. 5 illustrates another double pole double throw switch configuration.
Figure 6:
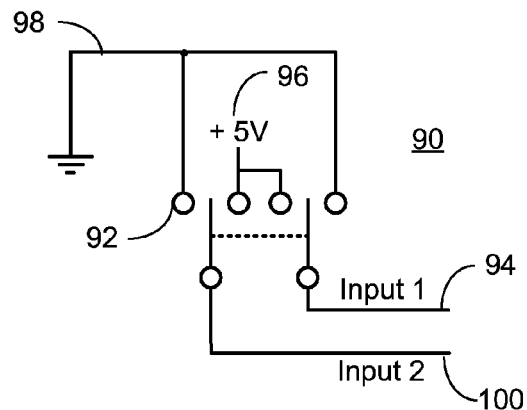
FIG. 6 illustrates yet another double pole double throw switch configuration.

In order to reduce the risk of a single point failure, various methods can be used to provide parity for switches. FIGS. 2 and 3 illustrate prior art single pole switch configurations. FIGS. 4-6 illustrate double pole switch configurations suitable for providing parity for switches used over a data link.

FIG. 2 illustrates a prior art circuit 30 with a switch 32 in a pull up configuration. An output of the switch 32 is configured as an input 33 to the controller 24. A supply voltage 34, in this case a +5 volt supply, is connected to the input 33 via a resistor 36. When the switch 32 is in the open position, the input 33 is pulled to the high value, such as +5 V. When the switch 32 is closed, the short to ground 38 causes the input 33 the be pulled to ground representing a low value. Throughout the remainder of this discussion, the high and low values will be understood to be logical 1 and 0 values as interpreted by a data network interface. The values are not limited to +5 V or ground and may include, for example, +12 V, or +24 V. Logical 1 or 0 values may be any range of voltages above and below a midpoint supply value depending on the particular circuitry in the data network interface and any desired noise margins.

FIG. 3 illustrates another prior art circuit 40 using a single pole double throw switch 42 where the switch contacts are connected to either a +5 V supply 46 or ground 48. Operation of the switch couples a circuit input 44 to either logic 1 or logic 0 based on switch position. Note that this configuration does not require the resistor 36 of the single pole implementation of FIG. 2.

FIG. 4 illustrates a circuit 50 that is a single pole double throw equivalent of the circuit 30 of FIG. 2. The switch 52 is configured with a $1^{st}$ contact coupled to +5 V 56 via resistor 58 and another contact coupled to +5 V 64 via resistor 66. In practice, the two resistors may be coupled to the same source. Each pole of the switch 52 is illustrated as coupled to ground 60. Each input to the data network interface, input 1 54 and input 2 62 will either present a logic 1 or a logic 0 based on the switch position.

FIG. 5 illustrates a circuit 70 that is a double pole double throw equivalent of the circuit 40 of FIG. 3. A switch 72 may have a first pole coupled to input 1 74 with associated switch contacts coupled either to +5 V 76 or ground 78. The switch 72 may have a second poll with its associated contacts also coupled to +5 V and ground 78. Operation of the switch 72 will cause both input 1 and input 2 to both present the same logic level at the same time.

In an embodiment, the +5 V connection 76 may be tied to the supply via a resistor (not depicted) to prevent a short to ground on either input 74 or 80 from pulling the supply voltage to a logic 0 value or causing an overcurrent condition through the shorted input.

FIG. 6 illustrates a circuit 90 that is a double pole double throw equivalent of the circuit 40 of FIG. 3, but arranged so that one input will always have an opposite polarity from the other input. The switch 92 is arranged so that the right-handed contacts of each pole are connected separately to +5 V 96 and ground 98 and the left-handed contacts of each pole are connected to ground 98 and +5 V respectively. Therefore, when the switch pole is to the right, input 1 94 is at ground or logic 0 and input 2 100 is at +5 V or logic 1. Conversely, when the switch pole is to the left, input 1 94 is connected to +5 V or logic 1 and input 2 100 is connected to ground or logic 0. While the configurations of FIGS. 4 and 5 are useful and valuable, the configuration of FIG. 6 reduces the risk of receiving a false readings should a short circuit occur across the inputs 94, 100 or any intermediate wiring connecting the switch 92 to the data network interface.

Figure 7:
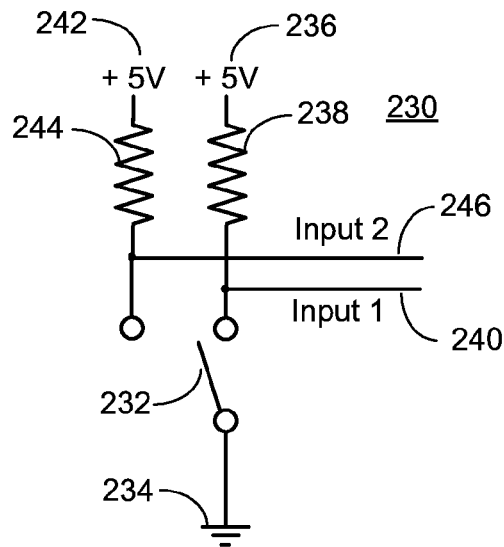
FIG. 7 is an alternate two output switch arrangement.

FIG. 7 illustrates a circuit 230 illustrating a single pole single throw switch application that is compatible with a double pole application in that two outputs are always configured even if only one is active. A single pole switch 232 is illustrated coupled to ground 234. A +5 V supply 236 is coupled via a resistor 238 to the switch 232 and ultimately to an input 240. When the switch 232 is on, the input 240 is a logic 0, and when the switch 232 is off, the input 240 is a logic 1. To maintain compatibility with double pole applications, a +5V supply 236 is tied via a resistor 238 to an data circuit input 240, providing a logical value 1 to a second input 246. Other configurations of pull up and pull down components may be used to provide other logical values.

Figure 8:
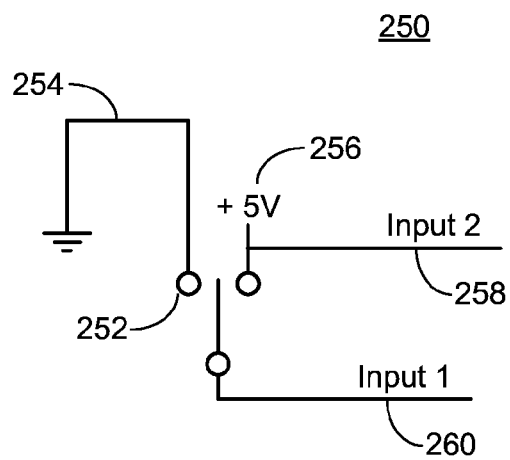
FIG. 8 is another alternate two output switch arrangement.

FIG. 8 illustrates another circuit 250 illustrating a single pole double throw switch 252 configured to provide two signals even though only one is switched. In this configuration, as well as that of FIG. 7, a controller such as engine controller 24 may receive a valid logic level on each available data slot in a multiplexed data transmission even though the controller 24 may be programmed to ignore one signal, or use the fixed signal to diagnose an issue at the switch site, e.g., loss of power in the cab. The switch 252 may couple the input 260 to either a logic 1 via the +5 V supply 256 or to a logic 0 level via the ground connection 254. The second input 258 is always a logic 1. As above, other combinations of logic 0 and 1 are configurable.

Figure 9:
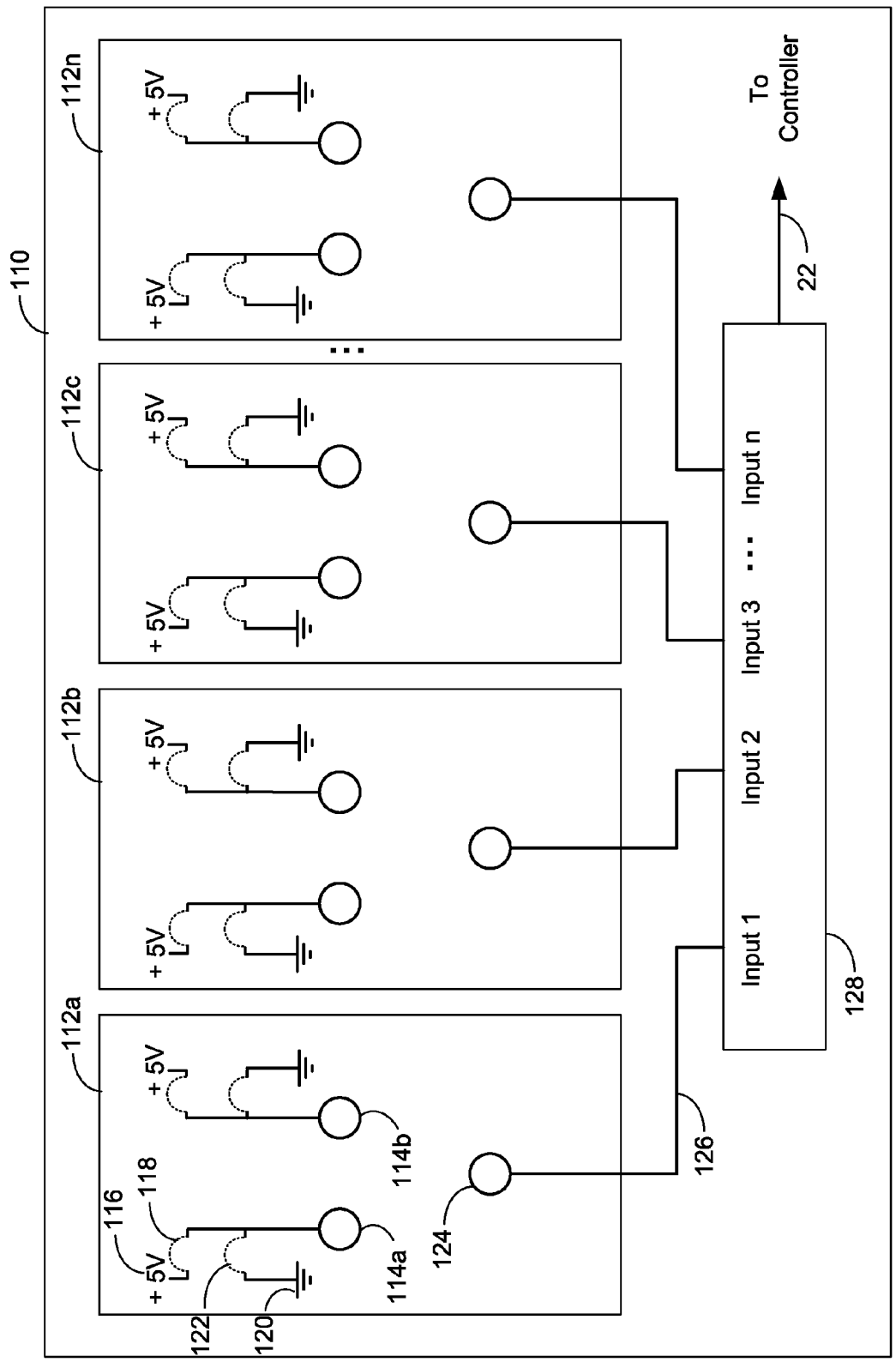
FIG. 9 is a block and schematic diagram of a socket module.

FIG. 9 illustrates a socket module 110. In an embodiment, the socket module 110 includes a plurality of sockets 112a, 112b, 112c, 112n. The ellipses indicates that a the socket module 110 may include more than the four sockets illustrated. The exemplary socket 112a includes biasing circuitry that enables the socket 112a to use a jumper 118 to couple contact to the +5 V source or to use the jumper 122 to couple the contact 114a to ground 120. The contact 114b is similarly configured. In an embodiment, the jumper connections may be arrange so that a single jumper assembly may couple the respective contacts 114a and 114b to opposite logic levels. Each of the sockets 112a, 112b, 112c and 112n are arranged in a regular pattern so that compatible switches can be variously mounted, as discussed further below.

A pole contact 124 is coupled via a connection 126 to a data network interface 128. The data network interface may be any of several data interfaces that take individual inputs and broadcast them to a controller, such as engine controller 24 of FIG. 1. The data network interface 128 captures the state of the each signal at the inputs and converts the inputs into a format for transmission via the data network 22. This may include level shifting, data serialization or packetizing, and over-the-wire protocol management. In an embodiment, the data network interface 128 is or includes a controller area network (CAN) interface.

Figure 10:
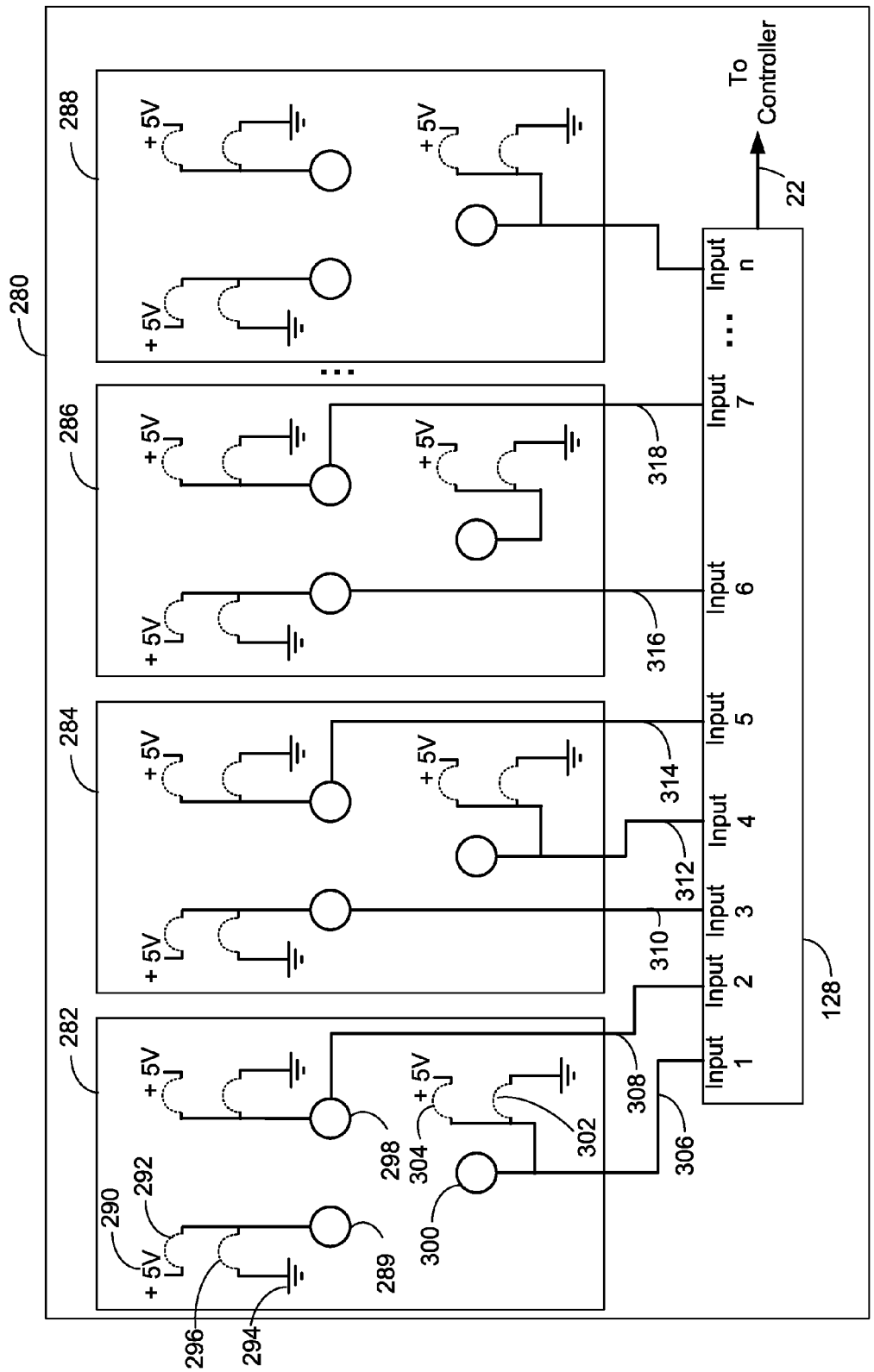
FIG. 10 is a block diagram of an alternate embodiment of the socket module of FIG. 9.

FIG. 10 a block diagram of an alternate embodiment of the socket module of FIG. 9, illustrating alternate output configurations for socket module 280 connections such as those suggested in FIGS. 7 and 8. The socket module 280 may include various configurations of sockets, 282, 284, 286, 288. The socket 282 shows a terminal 289 that may be configured via jumper or resistor 296 to connect to ground 294. The terminal 289 may instead be connected via a jumper or resistor 292 to +5V supply 290. A second terminal 298 maybe connected in similar fashion to ground or +5V supply. A pole terminal 300 may also be biased to ground or +5V supply via respective jumpers or resistors 302 and 304. An output connection 306 may couple the pole terminal to input 1 of the data network interface 128. An output connection 308 may couple the terminal 298 to input 2 of the data network interface 128. Socket 282 allows configuration of terminals to match that of the circuit 250 of FIG. 8, including other variations of logic 1 and 0.

The socket 284 is configured with each terminal capable of selective biasing via jumpers or resistors as discussed above. Because each terminal is connected to the data network interface 128 via respective connections 310, 312, and 314 all possible combinations of single pole single throw and single pole double throw outputs may be configured. For example, by connecting the pole terminal connection 312 to ground via a jumper and by connecting a resistor to the +5 V supply for the other two terminals, and installing a single pole single throw switch between the pole terminal and one other terminal, the circuit of FIG. 7 may be configured. The use of a single pole double throw switch at socket 284 may also be supported, providing functionality similar to that of the circuit of FIG. 8.

Socket 286 is configured with only the terminal connections 316 and 318 connected, supporting those circuit applications where the pole terminal is not directly connected to the data network interface 128. The socket 288 is configured with only the pole terminal connected to the data network interface 128, but has the ability to pull the pole terminal up or down via respective jumpers.

The configurations of sockets of socket module 280 in FIG. 10 are not limited to the variety shown or the number of sockets shown. Each socket may be identical and may be configured as shown in any individual socket 282, 284, 286, 228. Alternatively, the socket configurations may be mixed and matched in other variations that that specifically depicted in FIG. 10.

Figure 11:
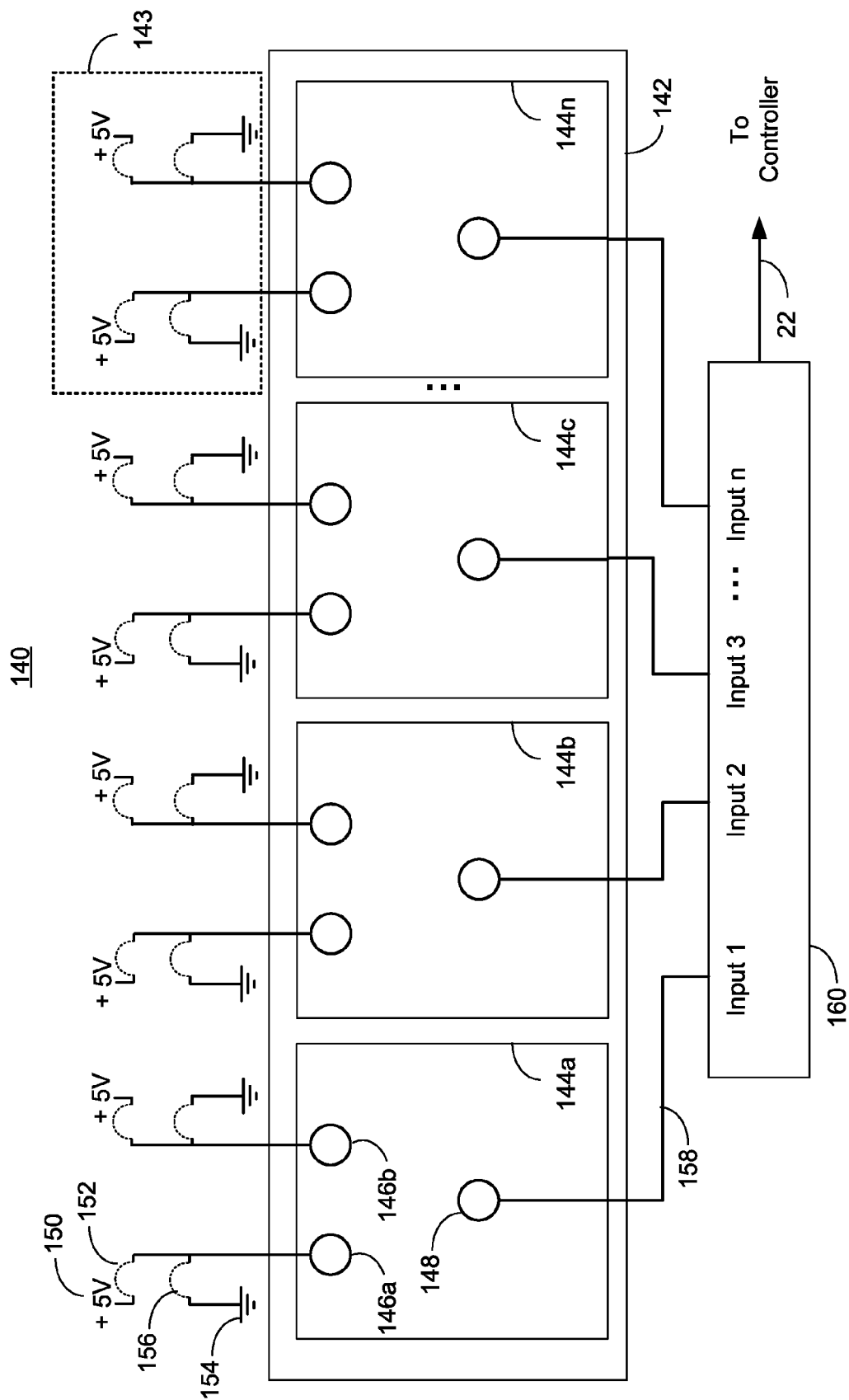
FIG. 11 is a block and schematic diagram of a socket module apparatus.

FIG. 11 illustrates a block and schematic diagram of another embodiment of a socket module apparatus 140. The socket module apparatus 140 includes a socket assembly 142, a plurality of socket bias circuits 143, and a data network interface 160. The socket assembly 142 may include a number of sockets 144a, 144b, 144c, and 144n. The number of sockets in the socket assembly 142 may vary. The socket bias circuits 143 are repeated for each socket but are noted in the illustration by a single dashed outline for a single socket for clarity. Each bias circuit 143 may include matching pairs of biasing components for each socket contact 146a and 146b. Similar to FIG. 9, the contact 146a may be connected to either +5 V 150 (logic 1) via jumper 152 or ground 154 (logic 0) via jumper 156.

A pole contact 148 of the socket 144a may be connected to a data network interface 160 via a connection 158. Each socket is similarly connected. The data network interface 160 processes signals presented at its inputs and delivers representative information to a controller via data network 22.

In an embodiment, the non-pole contacts of the sockets may be biased according to FIG. 5, where the logic 1 and logic 0 biasing is alternated across each socket. In another embodiment, the non-pole contacts may be biased according to FIG. 6, where, other than a first and last terminal in the lineup, pairs of terminals are biased to a logic 1 separated by pairs of terminals biased to a logic 0.

Figure 12:
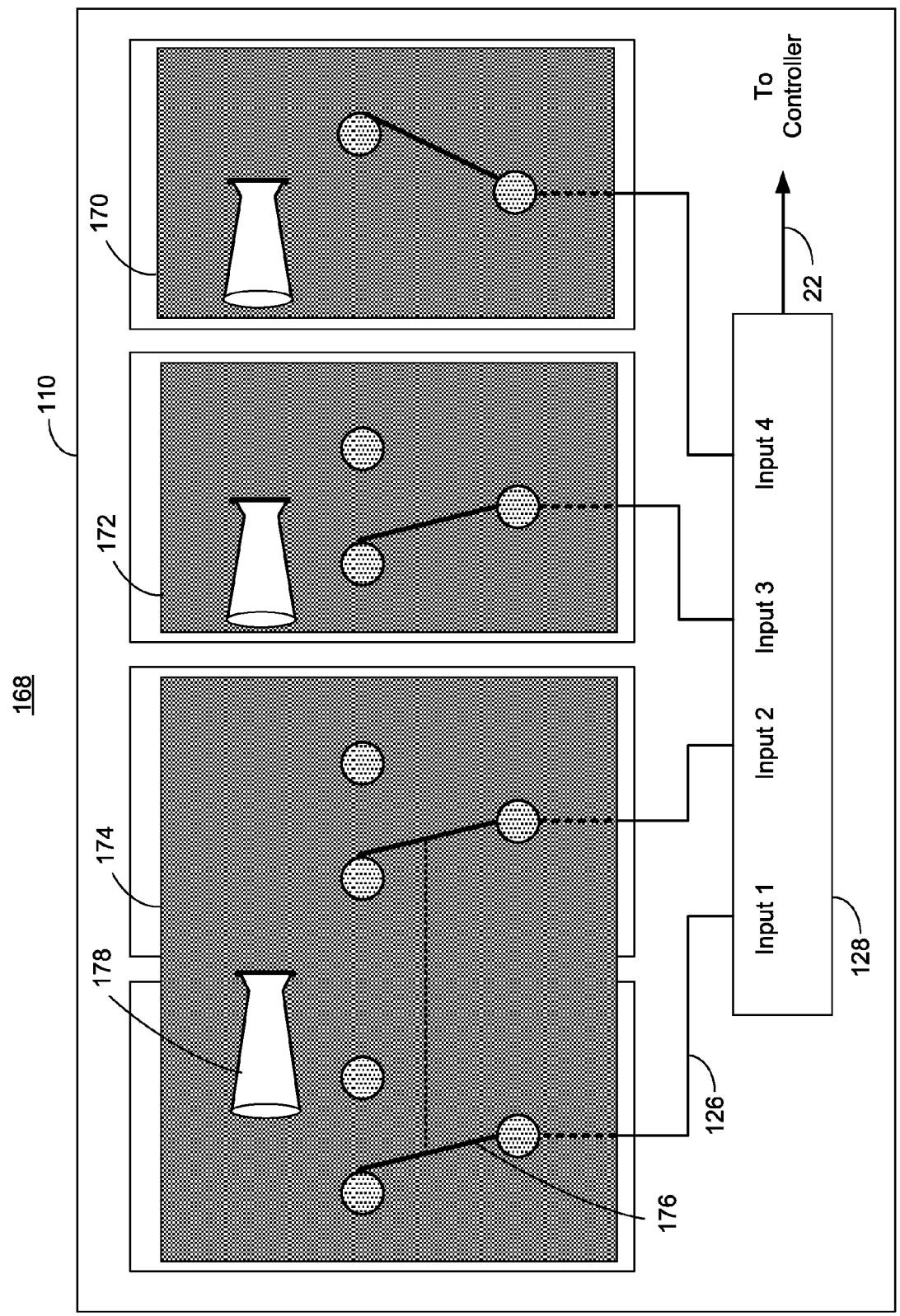
FIG. 12 is a block and schematic diagram of a parity data link system corresponding to the socket module of FIG. 9.

FIG. 12 is a block and schematic diagram of a parity data link system 168. The system 168 includes the socket module 110 described above with respect to FIG. 9 and includes a single pole single throw switch 170 installed in a first socket of the socket module 110, a single pole double throw switch 172 installed in a second socket of the socket module 110, and a double pole double throw switch 174. The switches 170, 172, and 174 are activated conventionally, for example, when the switch lever 178 is in one position, the poles of the switch 174 are connected to respective first contacts. When the switch lever 178 is toggle to another position, poles of the switch are coupled to a second set of respective contacts.

Depending on how the biasing circuit jumpers, e.g. jumpers 118 or 122 of FIG. 9, are connected, logic 1 or logic 0 data signals will be transmitted via connection 126 to input 1 of the data network interface 128. Correspondingly, a logic 0 or logic 1 will be transmitted to input 2. As discussed above, the signals at input 1 and input 2 may be the same logic level for each switch position or may be opposite logic levels. The single pole switches will operate in a conventional manner and will also present logic 1 or logic 0 levels to their respective inputs 3 and 4 of the data network interface 128. Additional bias circuitry as shown in FIG. 2 may be required for the single pole single throw switch 170.

While the configuration illustrated in FIG. 12 illustrates one double pole switch covering two single sockets, an additional double pole switch could be placed where the two single pole switches 170 and 172 are shown. In another embodiment, for example, socket 1 may be used for a single pole switch, sockets 2 and 3 for a double pole switch and socket 4 may be used to a second double pole switch. Further, when the socket module 110 has additional positions, for example, six individual sockets, other combinations of single and double pole switches may be used.

Figure 13:
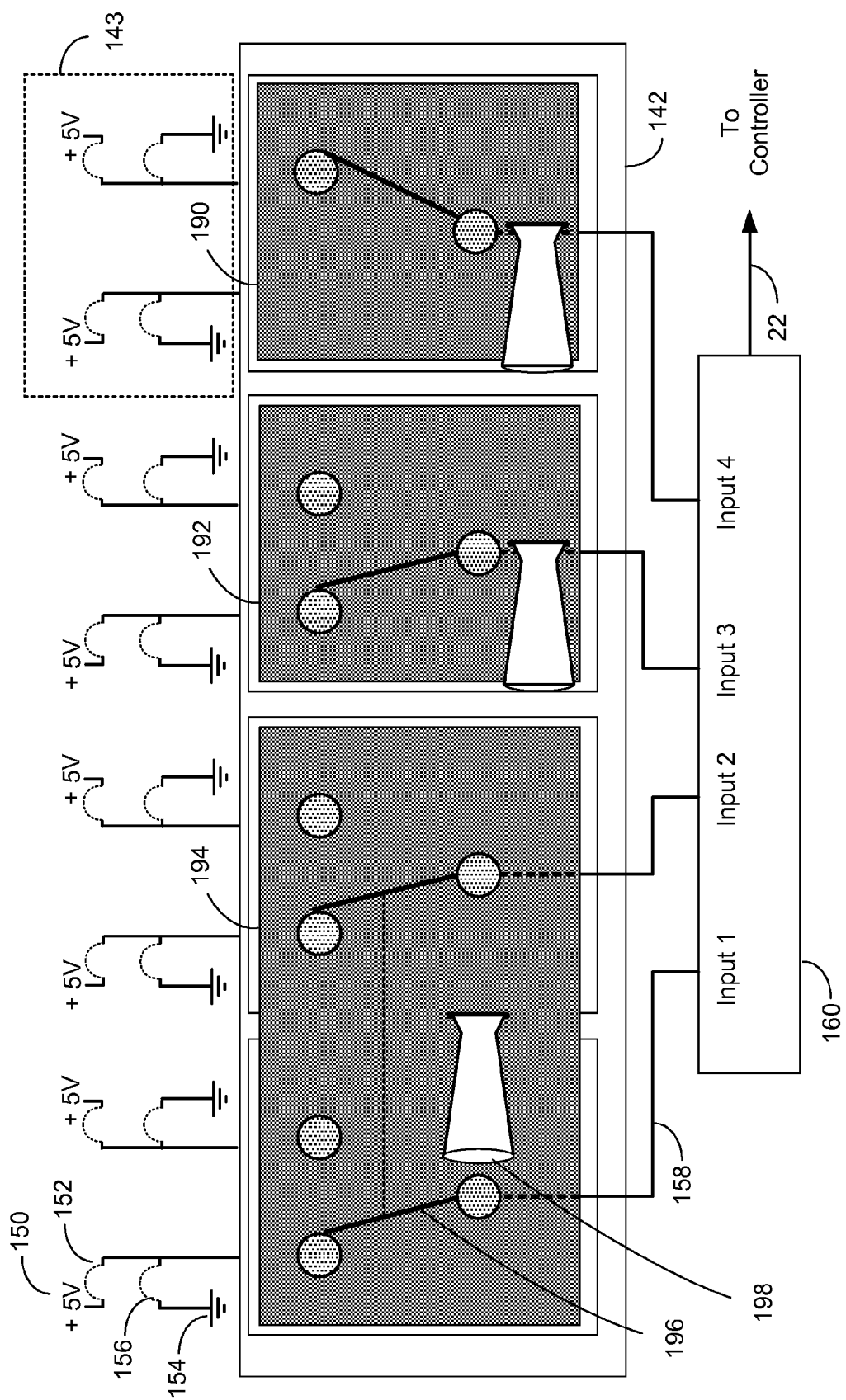
FIG. 13 is a block and schematic diagram of a parity data link system corresponding to the socket module apparatus of FIG. 11.

FIG. 13 illustrates use of the socket module apparatus 140 of FIG. 11 to implement the parity data link system. Single pole switches 190 and 192 are installed in two single sockets of the socket assembly 142. A double pole switch 194 is installed over two single pole sockets of the socket assembly 142. Each non-pole contact of the switches may be biased using the biasing circuits 143 as described above.

When the switch lever of a switch, for example, switch lever 196 of switch 194 is in one position, the pole contact of the switch may be biased to a logic 1 or logic 0. Additional bias circuitry as shown in FIG. 2 may be required for single pole single throw switch 190.

Each of the pole contacts of double pole double throw switch 194 may provide logic 1 or logic 0 signals at inputs 1 and 2 of the data network interface 160 via their respective signal lines, such as connection 158. The data network interface may provide the state of each of the inputs, including inputs 1 and 2 to the controller via network connection 22.

In operation, an operator, or other mechanical pickup, may toggle the double pole switch, for example, switch 174 of FIG. 12 or switch 194 of FIG. 13 from a first position to a second position causing a signal at the double pole switches corresponding input at the data network interface to change. At the controller, code executing on a physical processor, such as a microprocessor, may determine the logical state of both signal inputs to the data network interface 160. Depending on the requirements of the application, both signals may be required to change before the controller effects the change associated with the switch. In some circumstances, a single signal line transition may be accepted as representing a switch transition, for example, when dealing with a signal associated with primary safety, such as a parking brake set command (perhaps in conjunction with other conditions such as the vehicle at rest). In yet another circumstance, a single transition may set an alarm and no output state change is effected.

In other embodiments, switches with more than two throws may be used to further increase redundancy. For example, a 3 pole 3 throw switch may be inserted over three sockets and switch state information may be carried over three input positions of the data network interface 160. The controller 24 may be programmed with information about a particular switch configuration so that logic polarity are known and an appropriate input voting scheme is implemented.

In each of these embodiments the sockets and socket connections may be laid out on a grid, or at least at regularly spaced so that switches may be constructed to fit into the sockets as illustrated above. In one embodiment, non-pole contacts are evenly spaced across all sockets in the socket assembly 142 on one row while pole contacts are evenly spaced across a second row. However, in other embodiments, as long as the sockets are evenly spaced, corresponding switches may be constructed to match the exact contact spacing so that a double pole double throw switch may be inserted using any two adjacent single pole sockets.

As discussed above with respect to FIG. 5, any of the embodiments of FIGS. 6-10 may include pull up resistors on the supply-side connection to prevent a short to ground on an input from dragging the supply to a logic 0 voltage level or creating a potentially damaging high current situation at the shorted input.

Figure 14:
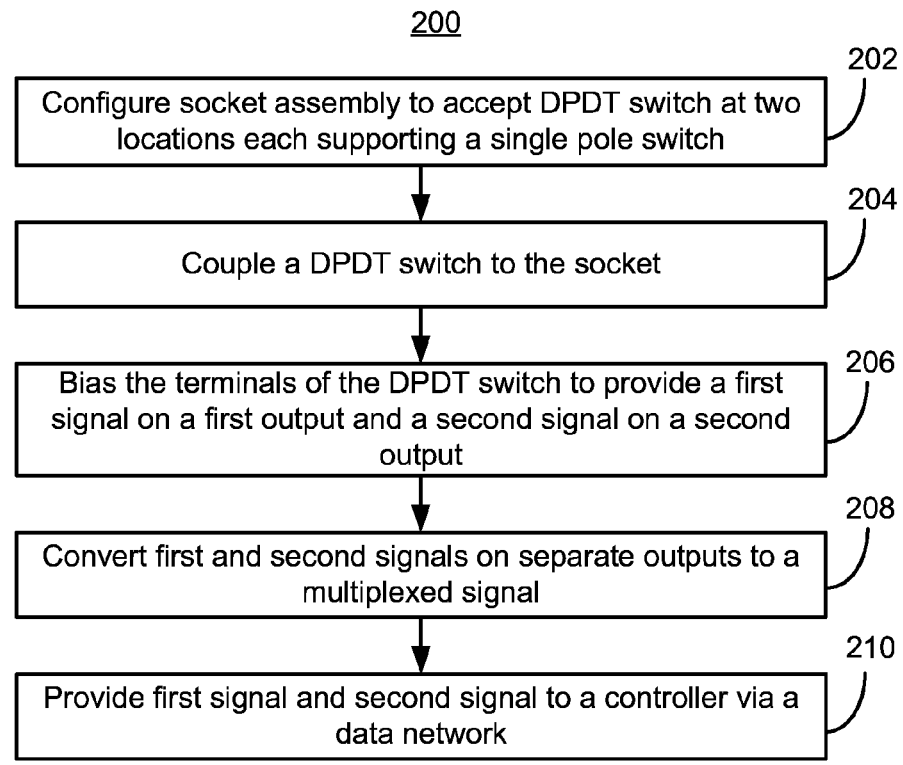
FIG. 14 is a simplified and exemplary flow chart of a method of providing a parity data link system.

FIG. 14 is a flow chart of a method 200 of providing a parity data link system on a vehicle data bus using a double pole switch. At a block 202, a socket assembly having multiple sockets may be configured to accept a double pole double throw (DPDT) switch at two locations that each support a single pole switch. Configuring the socket module may include accepting a plurality of DPDT switches in combination with one or more single pole switches. The single pole switches may be either single pole single throw (SPST) switches or single pole double throw (SPDT) switches.

At a block 204, a DPDT switch may be coupled to the switch socket over more than one socket so that each pole output of the double pole double throw is connected to one pole output from adjacent switch sockets.

At a block 206, the terminals of the DPDT switch may be biased so that the terminals of the DPDT switch are coupled to a logical 1 and logical 0, in some cases +5 V and ground, respectively. In one embodiment the each pole output of the double pole double throw switch are bias to the same logic level and in another embodiment the switch contacts are biased so that the pole contacts are at opposite logical values. In an embodiment, the bias circuits may be part of a socket module.

At a block 208, a data network interface 160 may convert the separate signals from each pole of the double pole double throw switch 172 to a multiplexed signal.

At a block 210, the multiplexed separate signals from each pole of the switch may be transmitted to a controller via a data network 22. The controller may then determine whether to accept a change in the signal by comparing the relative states of the separate signals. In this fashion, parity, or redundancy is provided for the switch operation.

Industrial Applicability

The system and method described above provides a number of safety, maintenance, and non-obsolescence benefits for vehicle manufacturers and owner/operators. First, the use of data parity for switch operation improves reliability for switch-based inputs in vehicles, particularly safety-related functions in construction or other heavy equipment. Second, using a data network to carry parity information, i.e., redundant switch output information from a double pole or greater switch, allows the extra information used for a particular switch operation to be carried to a controller without increasing the size or otherwise altering the configuration of a vehicle wiring harness. Third, the use of sockets and switches that allow reconfiguration of the system by simply changing a switch from a single pole to double pole switch and making a corresponding software change in the controller permits system upgrades based on owner preferences, implement changes, or for regulatory compliance without any costly rework of the equipment infrastructure.

These factors greatly increase the flexibility and reliability of vehicle systems while reducing the cost of ownership and possibly extending the life of equipment by allowing aftermarket reconfiguration of systems to add redundant switch capability when desired and to remove it when it is no longer required.

What is claimed is:

1. A method of providing switch status confirmation on a vehicle data bus using a double pole switch, the method comprising:
   configuring a socket module having multiple sockets configured to accept the double pole switch at a location configured to accept no more than two single pole switches, each of the multiple sockets having terminals;
   coupling the double pole switch to the socket module;
   biasing at least a portion of the terminals of the double pole switch to provide a first signal on a first common output of the double pole switch and a second signal on a second common output of the double pole switch; and
   providing the first signal and the second signal to a controller via a data network.

2. The method of claim 1, wherein biasing the terminals of the double pole switch comprises biasing the first signal and the second signal to opposite logical values.

3. The method of claim 1, wherein biasing the terminals of the double pole switch comprises biasing the first signal and the second signal to the same logical values.

4. The method of claim 1, wherein the biasing the terminals comprises providing a bias circuitry in the socket module.

5. The method of claim 1, wherein configuring the socket module comprises configuring the socket module for accepting at least one double pole switch in combination with one or more single pole switches.

6. The method of claim 5, wherein the one or more single pole switches are one of a single pole single throw (SPST) switch and a single pole double throw (SPDT) switch and the at least one double pole switch is one of a double pole single throw switch and a double pole double pole switch.

7. The method of claim 1, further comprising converting the first signal on the first common output and the second signal on the second common output to a data format for transmission via the data network.

8. A system that provides parity for switch operation in a vehicle, the system comprising:
   a controller responsive to input signals;
   a data network coupled to the controller;
   a socket module having a plurality of sockets with connection points arranged in a pattern configured to accept a plurality of single pole switches, each of the plurality of sockets having a respective output connection;

a double pole double throw switch having connection points configured for mating with the socket module, wherein the double pole double throw switch is coupled to the socket module over two of the plurality of sockets; and a data network interface coupled to each respective output connection of each of the plurality of sockets of the socket module that provides switch information via the data network to the controller.

9. The system of claim 8, wherein the data network interface is incorporated in the socket module.

10. The system of claim 8, wherein each of the plurality of sockets is configured for a single pole single throw switch and an output connection of each of the plurality of sockets is tied to a voltage source through a resistor and a common contact of each switch is tied to a ground.

11. The system of claim 8, wherein each of the plurality of sockets is configured for a single pole double throw switch and each respective output is coupled to a common contact of its respective switch and for each of plurality of sockets a first terminal is tied to a voltage source and a second terminal is tied to ground.

12. The system of claim 8, wherein each of the plurality of sockets is configured for a single pole double throw switch and each respective output is coupled to a common contact of its respective switch and for each switch a first terminal is tied to a voltage source and a second terminal is tied to ground.

13. The system of claim 12, wherein the first terminals tied to a voltage source alternate with second terminals tied to ground across the socket module.

14. The system of claim 12, wherein the first terminals tied to the voltage source are consecutively paired, separated by consecutively paired second terminals tied to ground across the socket module other than a first and a last terminal.

15. The system of claim 8, wherein the data network is a controller area network (CAN).

16. A socket module supporting parity information for switch closures comprising:

a plurality of switch sockets with terminal points arranged in a repeating pattern arranged to accept a single pole switch at each of the plurality of switch sockets and to accept a double pole switch via any two adjacent switch sockets of the plurality of switch sockets; and a data network controller configured to receive information from at least one terminal of each of the plurality of switch sockets and further configured to transmit the information to a controller over a multiplexed data network.

17. The socket module of claim 16, further comprising:

a bias circuit that causes a logic 1 or a logic 0 to appear at an output terminal of each of the plurality of sockets at which a switch has been attached.

18. The socket module of claim 17, wherein the bias circuit couples one terminal from each of the plurality of switch sockets to a voltage source via a resistor and couples another terminal from each of the plurality of switch sockets to a ground.

19. The socket module of claim 17, wherein the bias circuit couples a first terminal from each of the plurality of switch sockets to a logic 1, couples a second terminal from each of the plurality of switch sockets to a logic 0, and couples a common connection from each of the plurality of switch sockets to the data network controller.

20. The socket module of claim 16, wherein the data network controller is a controller area network (CAN) controller and the multiplexed data network is a CAN.

\* \* \* \* \*

UNITED STATES PATENT AND TRADEMARK OFFICE
CERTIFICATE OF CORRECTION

| | | |
|---|---|---|
| PATENT NO. | : 8,903,566 B2 | Page 1 of 1 |
| APPLICATION NO. | : 13/741836 | |
| DATED | : December 2, 2014 | |
| INVENTOR(S) | : Darrel Berglund | |

It is certified that error appears in the above-identified patent and that said Letters Patent is hereby corrected as shown below:

Specification

Column 8, line 1, delete "Industrial Applicability" and insert -- INDUSTRIAL APPLICABILITY --.

Signed and Sealed this
Seventeenth Day of November, 2015

Michelle K. Lee
*Director of the United States Patent and Trademark Office*